US006484208B1

United States Patent
Hilland

(10) Patent No.: US 6,484,208 B1
(45) Date of Patent: Nov. 19, 2002

(54) LOCAL ACCESS OF A REMOTELY MIRRORED DISK IN A COMPUTER NETWORK

(75) Inventor: Jeffrey R. Hilland, Cypress, TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/609,440

(22) Filed: Jul. 3, 2000

Related U.S. Application Data

(63) Continuation of application No. 08/730,264, filed on Oct. 15, 1996, now abandoned.

(51) Int. Cl.[7] .............................................. G06F 15/173
(52) U.S. Cl. ...................................................... 709/238
(58) Field of Search ................................. 709/213, 238, 709/239; 714/2, 4, 6, 10, 13

(56) References Cited

U.S. PATENT DOCUMENTS

| | | | | |
|---|---|---|---|---|
| 4,534,024 A | | 8/1985 | Maxemchuk et al. ........ 370/445 |
| 5,001,628 A | | 3/1991 | Johnson et al. ............... 707/10 |
| 5,157,663 A | | 10/1992 | Major et al. ................... 714/10 |
| 5,237,693 A | | 8/1993 | Kiyohara et al. ............ 709/229 |
| 5,390,316 A | | 2/1995 | Cramer et al. ............... 709/201 |
| 5,463,381 A | | 10/1995 | Ryu et al. ...................... 707/10 |
| 5,469,549 A | | 11/1995 | Simpson et al. ............. 709/213 |
| 5,633,999 A | | 5/1997 | Clowes et al. .................. 714/6 |
| 5,668,943 A | * | 9/1997 | Attanasio ............... 395/182.05 |
| 5,673,384 A | | 9/1997 | Hepner et al. .................. 714/6 |
| 5,721,906 A | | 2/1998 | Siefert ............................ 707/9 |
| 5,757,642 A | * | 5/1998 | Jones ......................... 364/134 |

* cited by examiner

*Primary Examiner*—Glenton B. Burgess
*Assistant Examiner*—Tod Kupstas
(74) *Attorney, Agent, or Firm*—Akin, Gump Strauss Hauer & Feld LLP

(57) ABSTRACT

A computer network has a number of nodes which interact with one another via messages using a network protocol, and a node may access various network resources such a remote disk drives by the network. A disk drive is mirrored so that it may be accessed via one node when the drive is actually located at another node. This mirroring is transparent to the node which originates a disk request. A high speed communications path is provided between the node which actually has the disk resource and the node from which the disk drive is mirrored; this path is usually separate from the primary network path. On the communications path between the two nodes, a packet protocol is used which conveys a minimum but adequate amount of information needed to satisfy the requirements for disk I/O to take place between matching remote disk mirror drivers on the two nodes. The packet structure minimizes the need for creating new storage objects and saving them in implementing the mirroring functions. This packet identifies the remote drive and the function to be performed, has a field for status of a request packet, defines the length of the data field, and conveys the data, if any. The same packet is used for requests and returns. It contains values used to facilitate data flow instead of pointers and structures to queues. In a preferred embodiment, the packet is optimized for use with Windows NT structures, minimizing data copies.

4 Claims, 3 Drawing Sheets

LOCAL ACCESS OF A REMOTELY MIRRORED DISK IN A COMPUTER NETWORK

RELATED APPLICATIONS

This application is a continuation of U.S. application Ser. No. 08/730,264, filed Oct. 15, 1996, now abandoned, which is incorporated herein by reference.

BACKGROUND OF THE INVENTION

This invention relates to computer networks having mirrored or phantom disk resources, and more particularly to a mechanism for allowing disk I/O to take place between matching remote disk mirror drivers on a computer network.

The Windows NT operating system is described in detail in a set of five volumes entitled "Microsoft Windows NT Resource Kit—for Windows NT Workstation and Windows NT Server Version 3.51, Technical Reference Set" published by Microsoft Press, 1994. The five volumes include "Windows NT Messages," Windows NT Networking Guide," and "Windows NT Resource Guide." Reference is also made to M. Minasi et al., "Mastering Windows NT Server 3.51," 2nd Ed., published by Network Press, copyright by Sybex, Inc., 1996, and K. Siyan, "Windows NT Server—Professional Reference," New Riders Publishing, 1995. All of these publications are incorporated herein by reference. This Windows NT operating system includes facility for supporting a computer network in which resources on various nodes of a network can be accessed from any other node. For example, a disk storage resource on a first node can be accessed, as if it were local, by another node which may be far removed from the first node.

A function that is needed in some systems is that of disk mirroring or phantom disk access. Mirroring usually means that the contents of one disk are duplicated on another disk, i.e., every write to disk is mirrored on another disk, so redundancy is provided. In case of failure of one of the disks, the system can continue operating without hesitation. A degree of fault tolerance is thus provided. In the context of this application, mirroring can mean also that a disk resource physically located on a first node may be accessed transparently by another node, just as if the access was through the first node. This may also be referred to as phantom disk operation, or as "clustering" of disks. In any event, a function such as mirroring or phantom disk access as described here is not facilitated by the Windows NT operating system.

It has been the practice to configure a network operating system such as Windows NT in such a manner that servers can share disk drives over a local area network. However, there is no arrangement whereby disk drives on one machine can be made to appear as if they were physically located on another machine. The disk I/O requests available in Windows NT are made up or defined by so-called Major Function Code routines, and it is these routines which must be used in any efficient and compatible functionality of disk mirroring.

SUMMARY OF THE INVENTION

It is therefore one object of the present invention to provide an improved method of mirroring network resources such as disk drives on a computer network.

A further object of the invention is to provide a mechanism for allowing disk drives on one machine to appear as if they were physically located on another machine, particularly in a Windows NT network environment, and using standard Windows NT Major Function Code routines.

It is another object of the present invention to provide an improved mechanism for disk I/O to take place between matching remote disk mirror drivers.

It is yet another object of the present invention to provide a method and apparatus for accessing a remote disk through nodes on a network which mirror the disk, employing packet communication between the access node and remote node which is compatible with operating systems such as Windows NT or the like.

The above as well as additional objects, features, and advantages of the present invention will become apparent in the following detailed written description.

According to one embodiment of the invention, a mechanism is provided where disk I/O can take place between matching remote disk mirror drivers on a network (e.g., a LAN or local area network). A computer network has a number of nodes which interact with one another via messages using a network protocol, and a node may access various network resources such a remote disk drives as if they were local. A disk drive is mirrored so that it may be accessed via one node when the drive is actually located at another node. This mirroring is transparent to the node which originates a disk request. A high-speed communications path is provided between the node which actually has the disk resource and the node from which the disk drive is mirrored. This communications path is usually separate from the primary or "public" network path (i.e., the LAN). On the communications path between the two nodes, a packet protocol is used which conveys a minimum but adequate amount of information needed to satisfy the requirements for disk I/O to take place between matching remote disk mirror drivers on the two nodes. The packet structure minimizes the need for creating new storage objects and saving them in implementing the mirroring functions. This packet identifies the remote drive and the function to be performed, has a field for status of a request packet, defines the length of the data field, and conveys the data, if any. The same packet is used for requests and returns. It contains values used to facilitate data flow instead of pointers and structures to queues. In a preferred embodiment, the packet is optimized for use with Windows NT structures, minimizing data copies.

BRIEF DESCRIPTION OF THE DRAWINGS

The novel features believed characteristic of the invention are set forth in the appended claims. The invention itself however, as well as other objects and advantages thereof, will best be understood by reference to the following detailed description of an illustrative embodiment, when read in conjunction with the accompanying drawings, wherein:

DETAILED DESCRIPTION OF PREFERRED EMBODIMENT

Figure 1:
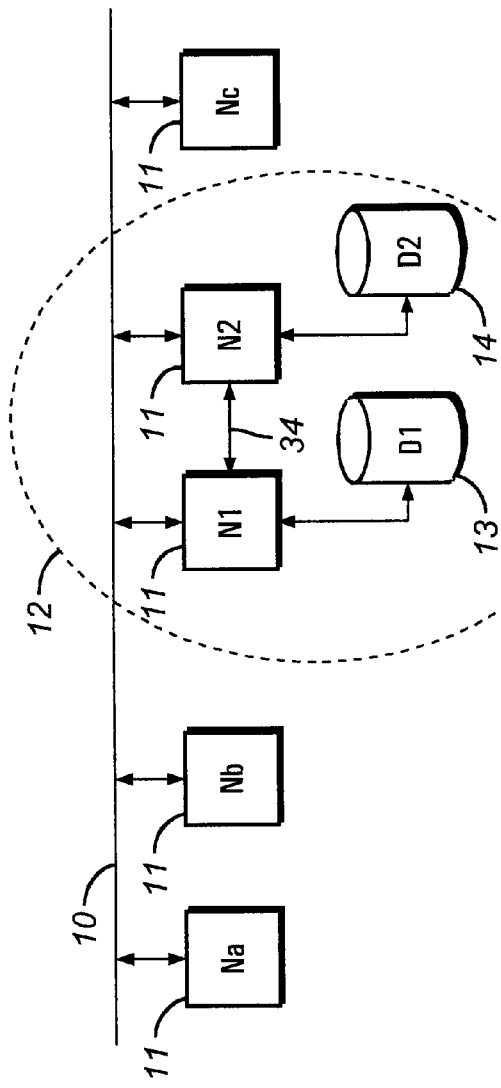
FIG. 1 is an electrical diagram in block form of computer network which may employ remote disk mirroring according to an embodiment of the invention.

Referring to FIG. 1, there is shown a computer network in which a local area or wide area network link 10 is employed to connect together a number of nodes 11. Each node 11 is a processor of some type, able to execute processes on a stand-alone basis, and also to send and receive messages using a standard network protocol, and generally to access network resources. In an example embodiment, the nodes are operating under the Windows NT operating system and network system. Two of the nodes 11 can be considered a cluster 12, in that the D1 and D2 disk drives 13 and 14 connected to these N1 and N2 nodes 11 can be accessed from other nodes 11 as if they were one, i.e., had a single network resource address "D" which can be reached via either node N1 or node N2. Or, the two nodes N1 and N2 can each mirror the disks D1 or D2 on the other node, according to the invention.

Figure 2:
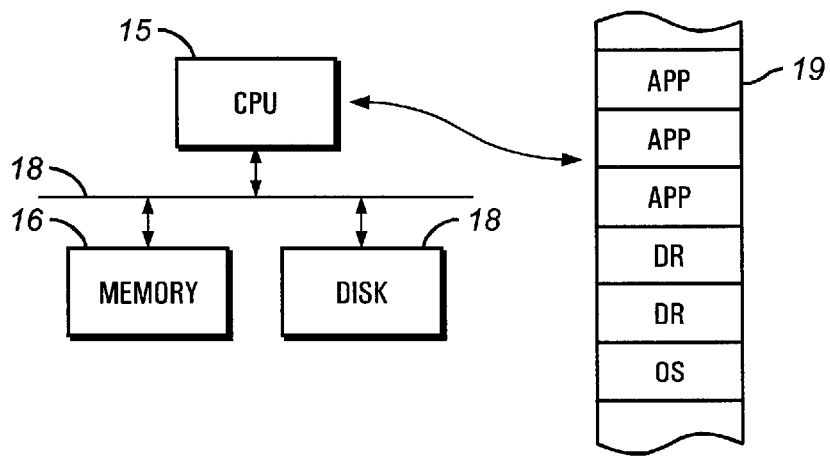
FIG. 2 is an electrical diagram of one of the nodes of the network of FIG. 1, along with a memory map of programs executing one the node, in an example embodiment.

Each one of the nodes 11 may be of the general form of FIG. 2. A processor or station consists of a CPU 15 accessing a main memory 16 and a storage media such as a disk drive 17 via a system bus 18. The computer would of course have a console with a monitor and keyboard, and would have I/O devices such as modem and network cards coupled to the system bus. A memory map 19 of the virtual memory created in the main memory and disk drive shows that the CPU is executing an operating system OS, with various device drivers DR and applications APP as will be explained.

The nodes 11 may be all connected together in a single LAN, or made be remote from one another, or in any combination of local and remote LANs and WANs. Communication from one node 11 to another may be by coaxial cable, phone line, satellite, microwave, etc., and/or nodes may be connected via the internet using the TCP/IP protocol. The nodes need not be running the same operating system, although the two nodes N1 and N2 are assumed to be running Windows NT in the specific example.

Figure 3:
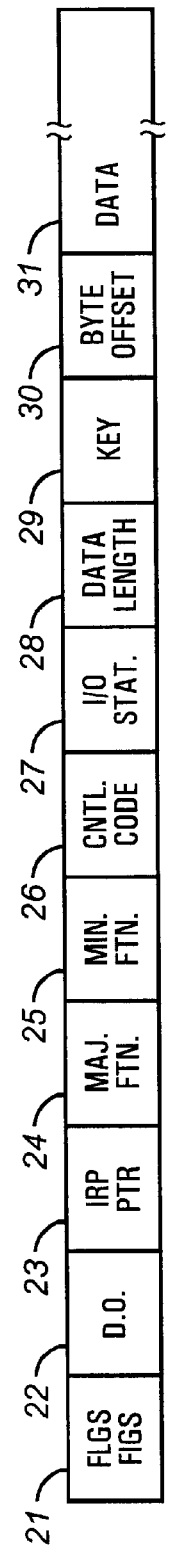
FIG. 3 is a diagram of a packet structure for communication between matched nodes in the network of FIG. 1.

Referring to FIG. 3, a packet structure 20 for use in the remote disk mirroring for a Windows NT driver is illustrated, according to the invention. A PsrsFlags field 21 is used to identify the request; a request can be of two types: a submitted request and a returning request. When I/O is submitted to the cluster server destination N2 from N1, the receiving driver in N2 needs to know if this request is from another server or is a returning request satisfied by another server. The PsrsFlags field 21 performs this function. The field 21 is a bit-mask field and values are OR-ed, AND-ed and Exclusive-Or-ed to set, test, and clear. The internal request bit in the PsrsFlags field 21 is used to distinguish a request which originated outside the operating system OS so that the system can tell if the data is for a local driver's disk request, such as that necessary for initialization. Note that this field should be the first in the packet to facilitate speed in processing and identification, since it is the first byte looked at.

A DeviceObject field 22 contains the device object of the disk on the target system so that when the driver receives the request, it can format the request and submit it directly to the device without any need for looking up a destination in a table. This facilitates quick processing and adds to the speed of request handling. This value must be requested by the sending driver one time before I/O to the device may begin.

The OriginalIrp field 23 in the packet 20 of FIG. 3 contains the IO request pointer for the sending driver's initial request. This field is not touched by the receiving server and is passed back when the request is satisfied. So, when the packet comes back, the driver knows which IRP to satisfy without looking through queues, spin-locking data, or any other resource-intensive activity.

The next three fields 24, 25, and 26 contain the data that the receiving server will need to know what to do with the request. These fields are a MajorFunction field 24, a MinorFunction field 25, and a, IoControlCode field 26. The fields 24, 25, and 26 correspond to the originating IRP's IRP stack fields and constitute the minimum control information necessary to initiate a request to a specific device. The IoControlCode field 26 need only be filled in on an IO control request IOCTL. The receiving driver can then initiate a local request to the device using these values so that the device driver knows what to do with that request.

An IoStatus field 27 contains the IO Status Block information from the receiving server. This field 27 is typically used by drivers to include status and return length information. Whatever the receiving server's local device returned in the IRP I/O Status Block should be copied to this field before the request is returned to the originating server.

The fields 28, 29 and 30 contain length, key, and byte-offset values, respectively. The length field 28 contains the length of a data portion 31, and this means the length of the data at the end of the packet 20, i.e., there is no information field after the data field 31. The key and byte-offset fields 28 and 29 are usually associated only with read and write operations. All three of the fields 28, 29, and 30 are used to initiate an IRP on the receiving server, usually only in case of a read or write request.

The data field 31 contains the actual data to be used in the transaction. Any request, be it an IOCTL, read, write, or other request, usually has data associated with it. Or, the data field can be a null field with a length field 28 indicating "zero." It is important that it is possible to chain MDL's together when sending them to an NT driver. This means that one MDL can describe the packet's information section and the next MDL can describe the data segment, and so copying of data is avoided when sending it to upper or lower drivers. The later feature is an important issue for speed, and this is why the data field is chosen as the last one in the packet 20. The fact that the data field 31 is the last in the packet also allows the receiving driver to use the data portion 31 directly for the IRP for the destination drive, thus eliminating any need to copy data when returning the packet.

The packet structure shown in FIG. 3, according to the invention, combines a minimum of information necessary to complete a request with the cross section of different kinds of requests to be handled. This structure provides capability for receives and returns, it is optimized for IRP processing, and it contains values used by the IO subsystem to facilitate data flow instead of pointers and structures to queues. This arrangement as in FIG. 3 also allows the use of natural Windows NT structures to keep data copies to an absolute minimum. Thus the arrangement is small but powerful and optimized for performance and maintainability.

Figure 4:
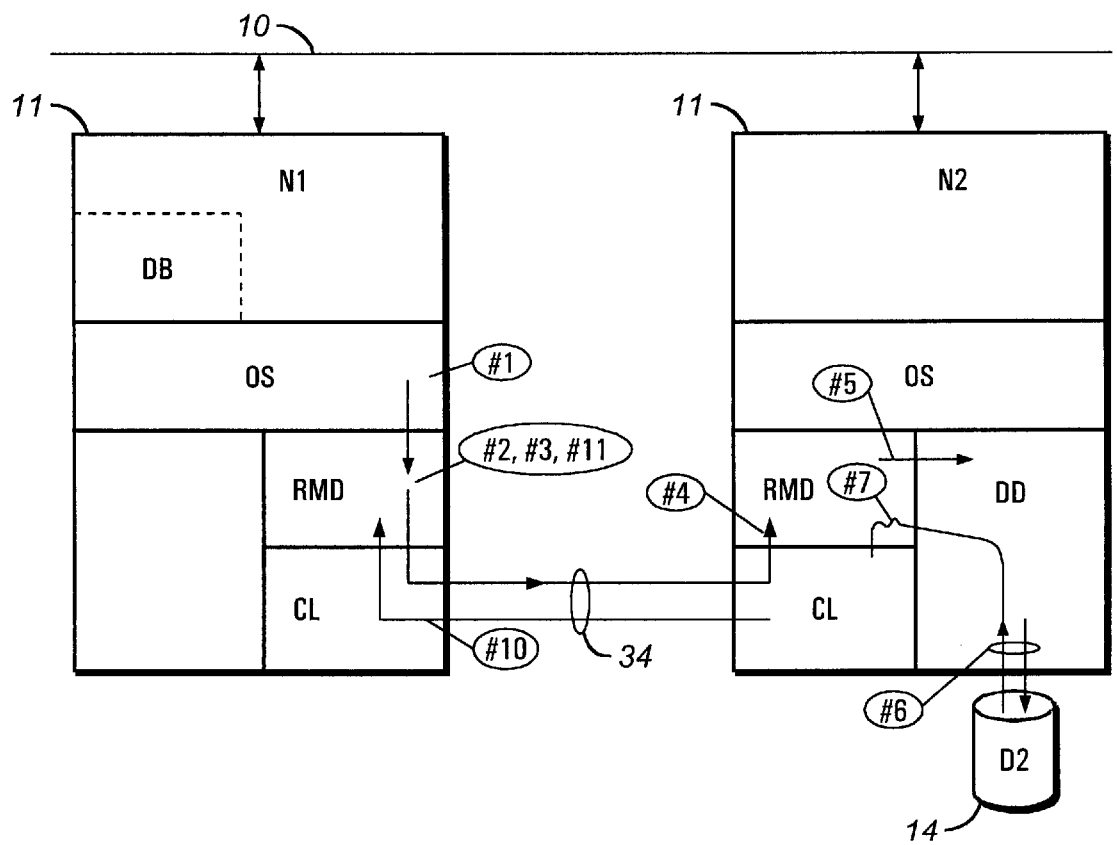
FIG. 4 is a diagram like FIG. 1, illustrating a remote disk mirroring operation.
Figure 5:
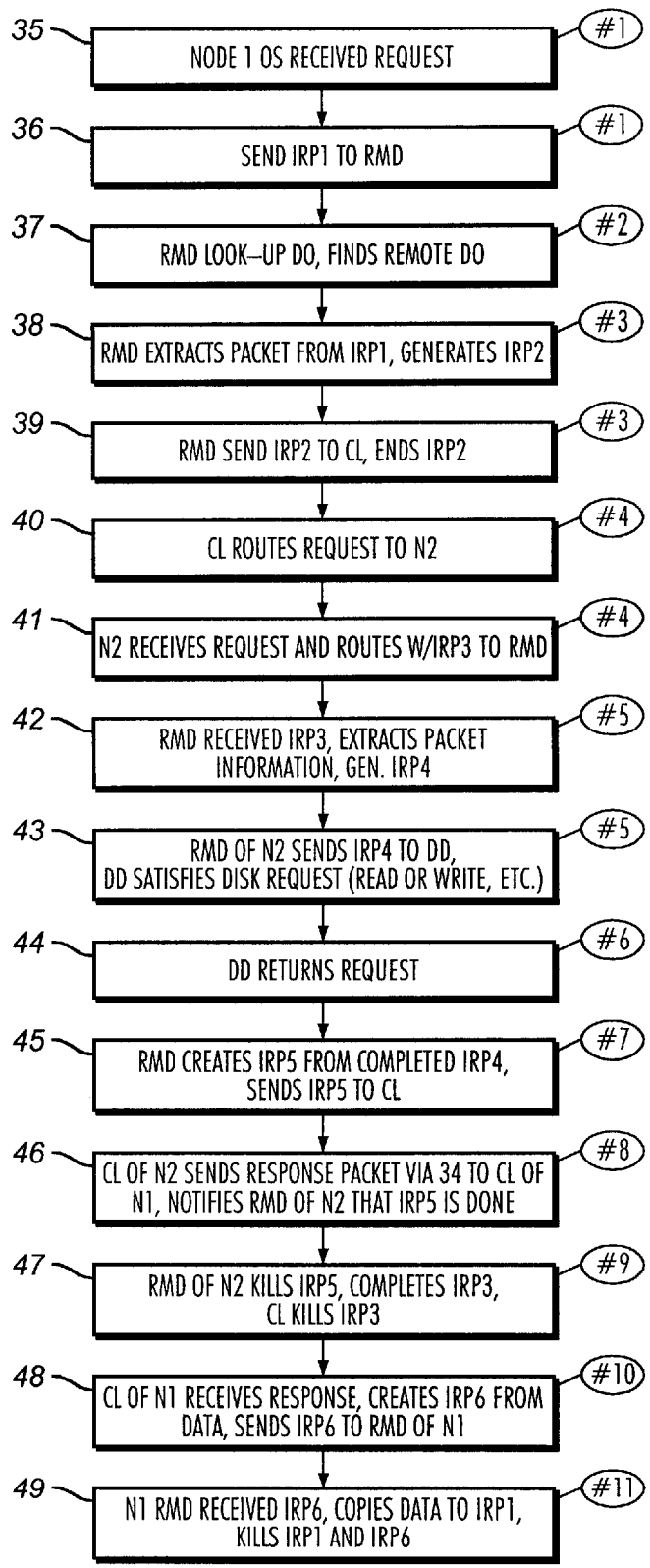
FIG. 5 is a logic flow chart of a process implemented by the system of FIGS. 1–4 using the concepts of the invention for remote disk mirroring.

Referring to FIG. 4, and the logic flow chart of FIG. 5, the operation of the system and method of the invention, using the packet structure of FIG. 3, will be described in more detail. Each one of the nodes N1 and N2 is executing a Windows NT operating system OS, and a disk driver DD for its local disk D1 or D2. Each also is executing a remote mirror disk driver RMD and a communications layer CL. The communications layers CL are able to handle the communications task between nodes N1 and N2 using a path 34 which is preferably separate from and much faster than the network 10; the speed is preferable to handle the disk accesses in a rapid manner, but is not necessary, as the nodes N1 and N2 may be remotely located, as on different LANs in a WAN, if that is desired. The disk mirroring sequence is initiated by a the operating system OS of the node N1, for example, receiving a data request from a remote node 11 via network 10, or from an application (e.g., a database program DB) running on the node N1 itself; the step is represented by the block 35 of FIG. 5 and by legend "#1" of FIG. 4. The request is a read or write to D2 disk 14 in this example, using remote access via N1 instead of N2 where D2 is physically located (it being assumed that N2 is not available to service the request directly, for some reason). In step #1, the operating system OS generates and sends an IRP or I/O request packet (of the packet format 20 of FIG. 3) which will be referred to as IRP1, to the remote mirror disk driver RMD of N1, see block 36 of FIG. 5. The RMD of N1 does a look-up for the device object DO for the disk D2 identified in IRP1 and finds that it is a remote device object, on N2, as indicated by block 37, step #2. The RMD then extracts pertinent information (i.e., the packet) from IRP1 and allocates and fills in another I/O request packet, IRP2 using the IRP1 packet information, block 38, step #3. RMD in N1 then sends the new IRP2 to the communications layer CL of N1, block 39. IRP1 is terminated at this point.

The request packet IRP2 is routed by the CL of N1 to node N2 via path 34, block 40, and the CL of node N2 receives the request and routes IRP3 to the RMD of N2, block 41, step #4. The RMD then extracts info from IRP3 (appearing as data in this IRP3) and uses it to allocate and fill in IRP4, block 42. In step #5, the IRP4 is sent to the disk D2 via the DD of N2, and the disk driver satisfies the disk request, step #6. If this is a write, the disk driver causes a write to the disk D2 using the data field 31 of the packet 20, or if it is a read the data is accessed and attached to IRP4 as a data field 31, marking the status field of the packet as a reply to request, see block 43. The completed request packet is sent by the DD of node 2 to the RMD of node 2, block 44, step #6, and in step #7 the RMD receives this completed IRP4, copies status (for write) or data (for disk read) to a packet and creates IRP5, then sends IRP5 to the CL of node 2, block 45.

The CL of node 2 sends packet across wire 34 and notifies the RMD of node 2 that IRP5 is done, block 46, step #8. The RMD of node 2 kills IRP5, and completes IRP3, so CL of node 1 kills IRP3, block 47, step #9. The CL of node N1 receives the request IRP5, allocates and sends IRP6 to RMD of N1 with packet made up from IRP5, block 48, step #10. The RMD of NI receives this IRP6, copies data from packet IRP6 to IRP1, completes IRP1 and IRP6, block 49, step #11. IRP1 is sent to the originating node or application.

While features of the invention have been shown and described with reference to an illustrative embodiment, it will be readily understood that the invention may be embodied in other forms, and various changes in the details of the illustrative embodiment, as well as in other embodiments of the invention, may be made by those skilled in the art without departing from the spirit and scope of the invention.

APPENDIX

```
//*************************************************************
//This is the packet structure for requests passed between
//the class and port drivers.
typedef_struct_DISK_REQUEST {
    //Important objects
    UCHAR    PrsFlags;              //Flags used to indicate
                                    //direction/destination, etc.
    //Codes to tell us what to do with the request
```

APPENDIX-continued

```
    PDEVICE_OBJECT Device Object;   //Handle for the remote drive
    PIRP       Originalrp;          //IRP of the original request
                                    //to complete
    UCHAR      MajorFunction        //IRP Stack values for major
    UCHAR      MinorFunction        //function code, minor
                                    //function code, and
                                    //IOCTL to execute, if it was
                                    //an IOCTL
    //Return information
    I/O_STATUS_BLOCK IoStatus       //Status for the result
    //Data values
    ULONG      Length;              //Length of the data portion
    ULONG      Key;                 //Key for request
    LARGE_INTEGER ByteOffset        //Byte offset of the request
    //Actual data
    CHAR()     Data;                //beginning of the data
}DISK_REQUEST, *PDISK_REQUEST;
#define DISK_REQUEST_SIZE sizeof(DISK_REQUEST)
//PsrsFlags values
#define PSRS_FLAG_SUBMIT_REQUEST       0x0001
#define PSRS_FLAG_RETURN_REQUEST       0x0002
#define PSRS_FLAG_INTERNAL_REQUEST     0x0004
//*************************************************************
//Another example of a packet structure providing additional functions
typedef struct_RMD_REQUEST {
    LIST_ENTRY  ListEntry
    PDEVICE_OBJECT DeviceObiect;    //Handle for the remote drive
    ULONG      RmdFlags;            //Flags used to indicate
                                    //direction/destination, etc.
    //Codes to tell us what to do with the request
    UCHAR      MajorFunction;       //IrpStack values for major
    UCHAR      MinorFunction;       //function code, minor
                                    //function code, and
                                    //IOCTL to execute, if it was
                                    //an IOCTL
    UCHAR      Flags;               //Buffer Flags
    //Return information
    I/O_STATUS_BLOCK IoStatus       //Status for the result
    //Data values
    ULONG      Length;              //Length of the data portion
    ULONG      Key;                 //Key for request
    LARGE_INTEGER ByteOffset        //Byte offset of the request
    PSENDER_CONTEXT  SenderContext  //Receiving side should
                                    //not touch this
    PLOCAL_CONTEXT   LocalContext   //Pointer to local context.
                                    //To be used locally. It
                                    //doesn't mean anything
                                    //to the other machine
    //Actual data
    CHAR()     Data;                //beginning of the data
}RMD_REQUEST,*PRMD_REQUEST;
#define RMD_REQUEST_SIZE sizeof(RMD_REQUEST)
//RMD Flags values
#define RMD_FLAG_SUBMIT_REQUEST        0x0002
#define RMD_FLAG_RETURN_REQUEST        0x0004
#define RMD_FLAG_INTERNAL_REQUEST      0x0008
#define RMD_FLAG_ERROR                 0x000F
#define FREE_DATA                      0x0001
#define FREE_DATA_MDL                  0x0002
#define FREE_LOCAL_CONTEXT             0x0004
#define FREE_SENDER_CONTEXT            0x0008
```

What is claimed is:

1. A computer network system comprising:

a plurality of nodes, each one of said nodes having a processor and having means for sending messages to and receiving messages from other ones of said nodes;

a network path connecting said nodes to one another for conveying said messages;

a first node of said plurality of nodes having first disk driver means;

a second node of said plurality of nodes having a disk storage resource, and having second disk driver means;

said first node being addressable from other ones of said nodes on the network, whereby said other nodes transfer data to and from said disk storage resource through said first node as if said disk storage resource was local to said first node; and a communication path between said first and second nodes for conveying packets of control information and data between said first and second nodes to facilitate said transfer of data to and from said disk storage resource, each of said packets having:
a data field which is at the end of said packet,
a field for identifying a request,
a field for identifying said disk storage resource,
a field for status information, and
a field indicating the length of said data field, wherein said communication path is separate from said network path, and wherein said communication path operates at a faster data rate compared to said network path.

2. A computer network system comprising:
a plurality of nodes, each one of said nodes having a processor and having means for sending messages to and receiving messages from other ones of said nodes;
a network path connecting said nodes to one another for conveying said messages;
a first node of said plurality of nodes having first disk driver means, said first disk driver means including:
a first remote disk mirror driver;
a first local disk driver; and
a local disk resource coupled to said first local disk driver;
a second node of said plurality of nodes having a disk storage resource, and having second disk driver means, said second disk driver means including:
a second remote disk mirror driver; and
a second local disk driver for accessing said disk storage resource;
said first node being addressable from other ones of said nodes on the network, whereby said other nodes transfer data to and from said disk storage resource through said first node as if said disk storage resource was local to said first node; and
a communication path between said first and second nodes for conveying packets of control information and data between said first and second nodes to facilitate said transfer of data to and from said disk storage resource, each of said packets having:
a data field which is at the end of said packet,
a field for identifying a request,
a field for identifying said disk storage resource,
a field for status information, and
a field indicating the length of said data field; and
a path for writing to both said local disk resource and to said disk storage resource when a request is received by said first node, to thereby mirror said local disk resource.

3. A method of operating a computer network having a plurality of nodes, each one of said nodes having the ability to send messages to and receive messages from other ones of said nodes, and the network having a network path connecting said nodes to one another for conveying said messages, said method comprising the steps of:

receiving at a first node of said plurality of nodes a request for disk access identifying a disk storage resource and generating a packet structure in response to said request;

sending said packet structure to a second node of said plurality of nodes having said disk storage resource coupled thereto;

said first node being addressable from other ones of said nodes on the network, whereby said other nodes transfer data to and from said disk storage resource through said first node as if said disk storage resource was local to said first node; and said step of sending being through a communication path between said first and second nodes for conveying packets of control information and data between said first and second nodes for accessing said disk storage resource, each of said packets having:
a data field which is at the end of said packet,
a field for identifying a request,
a field for identifying said disk storage resource,
a field for status information, and
a field indicating the length of said data field, and wherein said communication path is separate from said network path, and wherein said communication path operates at a faster data rate compared to said network path.

4. A method of operating a computer network having a plurality of nodes, each one of said nodes having the ability to send messages to and receive messages from other ones of said nodes, and the network having a network path connecting said nodes to one another for conveying said messages, said method comprising the steps of:

receiving at a first node of said plurality of nodes a request for disk access identifying a disk storage resource and generating a packet structure in response to said request;

sending said packet structure to a second node of said plurality of nodes having said disk storage resource coupled thereto;

said first node being addressable from other ones of said nodes on the network, whereby said other nodes transfer data to and from said disk storage resource through said first node as if said disk storage resource was local to said first node; and said step of sending being through a communication path between said first and second nodes for conveying packets of control information and data between said first and second nodes for accessing said disk storage resource, each of said packets having:
a data field which is at the end of said packet,
a field for identifying a request,
a field for identifying said disk storage resource,
a field for status information, and
a field indicating the length of said data field;

writing to a local disk resource coupled to said first local disk driver; and writing to both said local disk resource and to said disk storage resource when a request is received by said first node, to thereby mirror said local disk resource.

* * * * *